United States Patent [19]

Edwards et al.

[11] 4,410,341

[45] Oct. 18, 1983

[54] FLUID FILTER CARTRIDGE

[75] Inventors: William J. Edwards; John D. Stricklin, both of Oklahoma City, Okla.

[73] Assignee: Magnetic Peripherals Inc., Minneapolis, Minn.

[21] Appl. No.: 424,928

[22] Filed: Sep. 27, 1982

[51] Int. Cl.³ ............................................. B01D 46/10
[52] U.S. Cl. ........................................ 55/482; 55/492; 55/385 E; 55/498; 55/510; 55/DIG. 31; 55/529; 210/445; 210/450; 360/98
[58] Field of Search ...................... 55/385 E, 483, 484, 55/492, 498, 500, 510, 521, 529, DIG. 31, 482; 260/323.1, 445, 450, 493.5, 497.3; 360/97-99; 346/137; 369/261, 265

[56] References Cited

U.S. PATENT DOCUMENTS

| 2,993,564 | 7/1961 | Rodenhouse | 55/484 |
| 3,486,312 | 12/1969 | Kline et al. | 55/510 |
| 3,688,289 | 8/1972 | Schnell et al. | 340/174.1 |
| 4,308,041 | 12/1981 | Ellis et al. | 55/510 |
| 4,377,830 | 3/1983 | Patel | 360/98 |

Primary Examiner—David L. Lacey
Attorney, Agent, or Firm—Robert M. Angus; Joseph A. Genovese

[57] ABSTRACT

A filter cartridge for filtering fluid, such as air, within an enclosed housing, such as a disk drive, comprises a toroidal body having a pair of mating confronting halves fastened together. A pair of annular sheets of filter media are sandwiched between the halves and are separated by a ring member to engage each sheet of filter material against a respective one of the confronting halves. Fluid to be filtered flows radially through the cartridge to flow through at least two portions of the filter media. Optionally, a third sheet of filter material may be supported by the ring member to provide additional filtering.

4 Claims, 3 Drawing Figures

FLUID FILTER CARTRIDGE

This invention relates to fluid filters, and particularly to air filter cartridges for use in disk drives.

In U.S. Application Ser. No. 255,311, filed Apr. 17, 1981, now U.S. Pat. No. 4,377,830, for "Air Filter System for a Magnetic Disk Housing" by D. C. Patel, and assigned to the same assignee as the present application, there is described a filter system for a disk drive wherein air is continuously recirculated through a filtering system to reduce foreign particle contamination in the shroud area of a magnetic disk unit. Rotational movement of the disks within the shroud coact with the filter to circulate and filter the air within the disk housing.

In U.S. Pat. No. 4,308,041, there is described an air filter cartridge for use within a disk drive. The filter cartridge described therein comprises a pair of mating halves with a filter element sandwiched therebetween, formed in such a way as to form a toroidal filter capable of filtering air flowing radially through the filter. One problem associated with the filter cartridge described in U.S. Pat. No. 4,308,041 results from the fact that the confronting halves of the filter cartridge are of different design, thereby requiring separate tooling to fabricate each half thereof. Furthermore, the single filter element contained in the cartridge is not altogether adequate for filtering particulate matter from air within the disk drive.

It is an object of the present invention to provide a filter cartridge wherein having a plurality of filter media through which fluid being filtered must pass.

It is another object of the present invention to provide a filter cartridge having confronting halves of identical design to thereby reduce the fabrication costs of the filter.

In accordance with the present invention, an air filter cartridge comprises a rigid body formed by a pair of separate confronting halves. First and second sheets of annular filter media are placed between the confronting halves of the cartridge body, and a toroidal ring is nested between the two halves to separate the sheets of filter media. Fluid being filtered flows radially through apertures in the cartridge body, through the filter media, through the apertures in the toroidal ring, through the filter media again, and through opposite apertures in the body of the cartridge.

One feature of the present invention resides in the fact that the toroidal ring provides compressive strength to the filter cartridge to provide a good seal between the cartridge body and the portions of the disk drive in which it is placed.

Another feature of the present invention resides in the fact that an additional sheet of filter media may be wrapped around the toroidal ring to additionally filter fluid passing through the filter.

The above and other features of this invention will be more fully understood from the following detailed description and the accompanying drawings in which.

Figure 1:
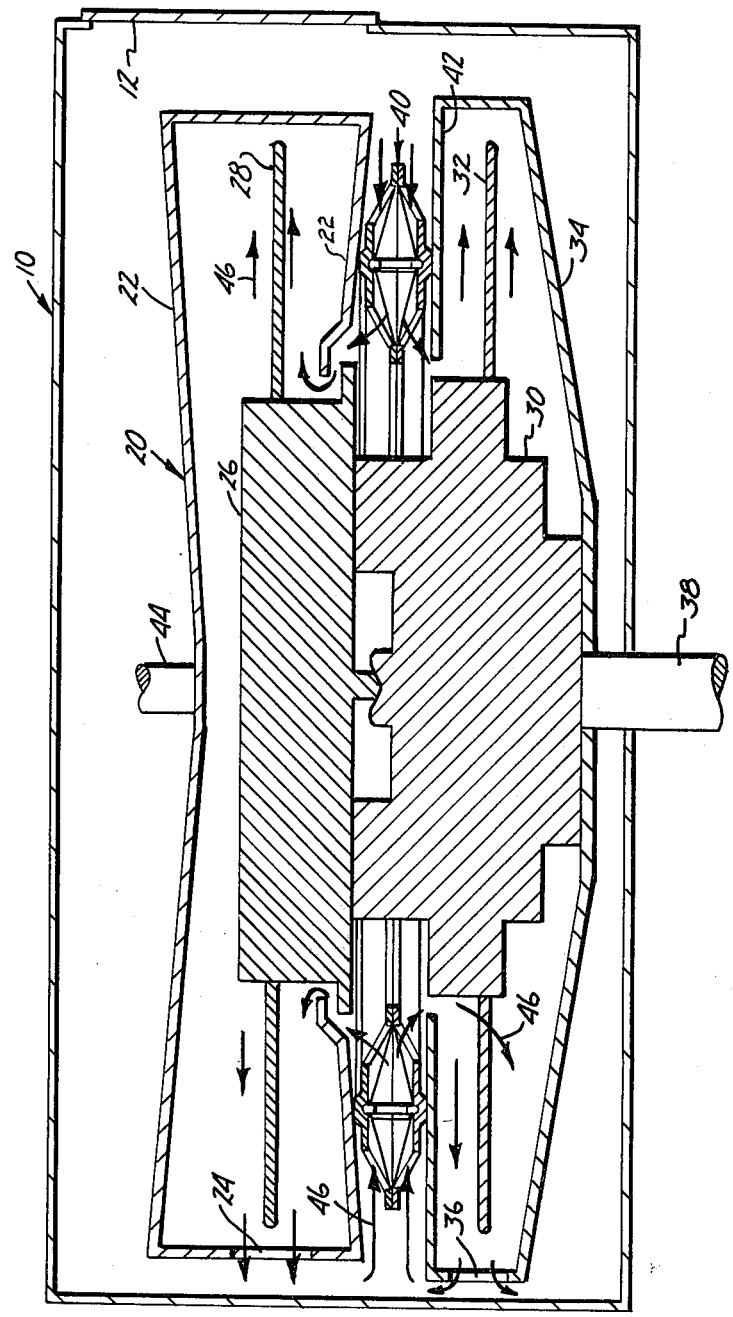
FIG. 1 is a diagramatic sectional veiw of a portion of a disk drive showing the position of a filter cartridge in accordance with the presently preferred embodiment of the present invention.

Referring to FIG. 1, there is diagramatically illustrated a disk drive having a filter cartridge in accordance with the presently preferred embodiment of the present invention. The disk drive comprises an enclosed housing 10 having a door 12 mounted to be opened to permit the insertion or removal of a disk cartridge generally illustrated at 20. The disk cartridge includes a cartridge housing 22 having one or more apertures 24, a hub arrangement 26, and a disk 28. Permanently mounted within the disk drive is a hub 30 to which a fixed disk 32 is attached. Disk 32 is enclosed within housing 34, which itself has one or more apertures 36. Shaft 38 is arranged to impart rotational movement to hub 30, and to hub 26 when attached thereto, thereby rotating disks 28 and 32. Filter 40, which is the subject of the present invention, is positioned on the top surface of separator plate 42. Means 44 is provided to bear against the top surface of housing 22 of cartridge 20 so that when cartridge 20 is in place, means 44 presses housing 22 against filter 40, thereby separating the lower portion of housing 22 from hub 26. A more detailed explanation of the structure of the disk drive and its relationship to cartridge 20 may be found in the aforementioned Patel application. When cartridge 20 is in place and disks 28 and 32 are rotated, the rotational movement of the disks causes fluid, such as air, within housing 10 to circulate toroidally and radially in the direction of arrows 46 through apertures 24 and 36 and filter 40.

Figure 2:
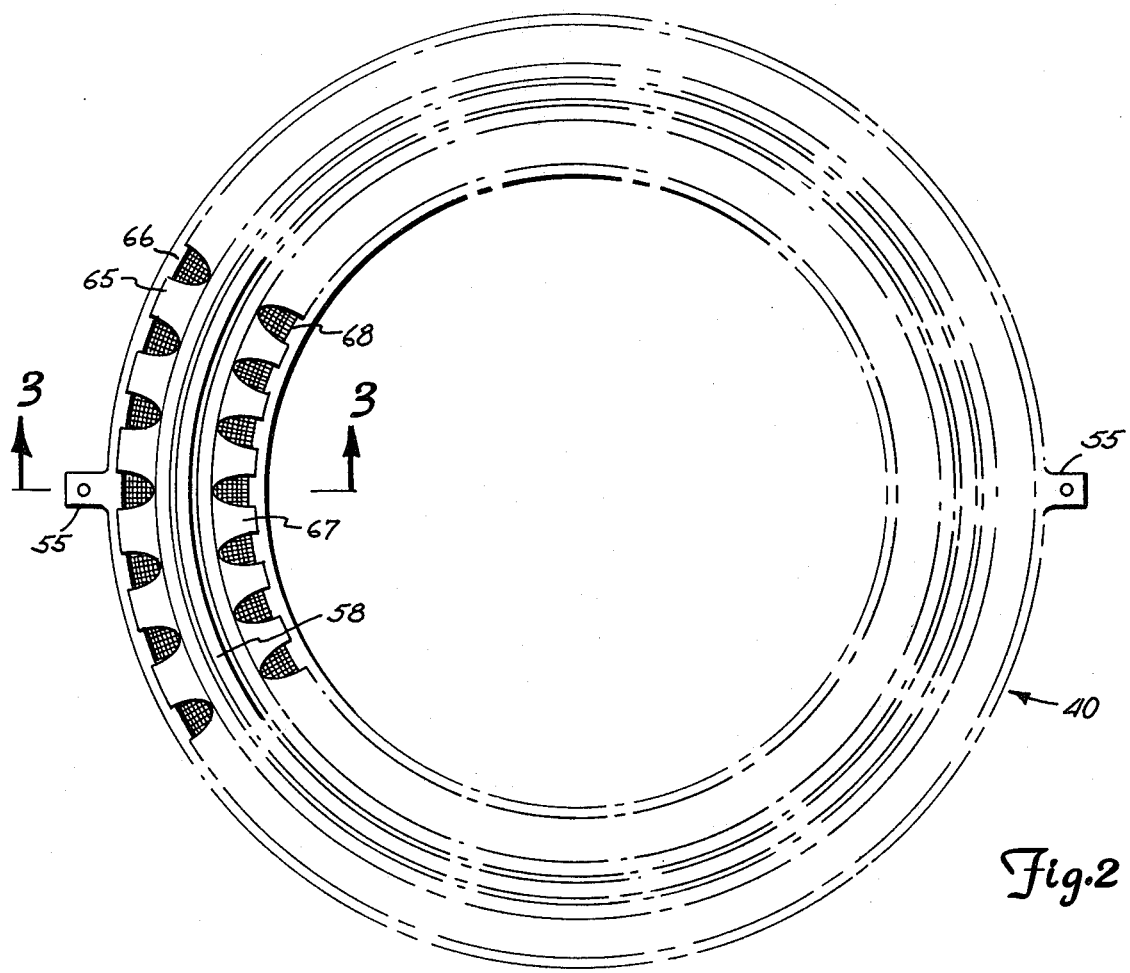
FIG. 2 is a plan view of a filter cartridge in accordance with the presently preferred embodiment of the present invention.
Figure 3:
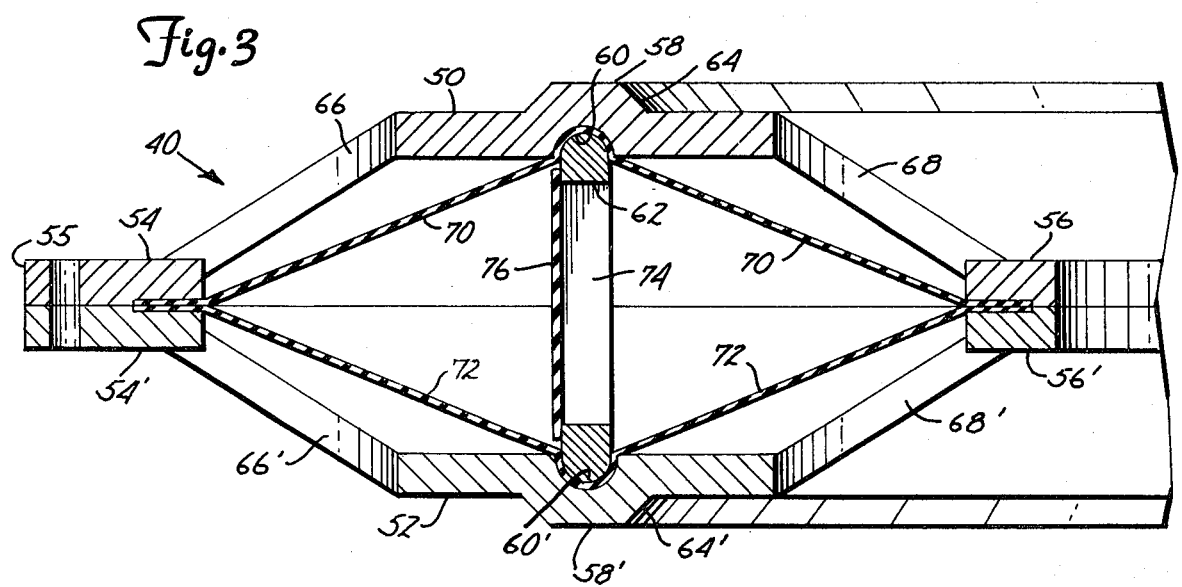
FIG. 3 is an enlarged section view taken at line 3-3 in FIG. 2.

With reference particularly to FIGS. 2 and 3, there is illustrated a filter cartridge in accordance with the presently preferred embodiment of the present invention. The cartridge comprises a body constructed of a pair of confronting toroidal halves 50 and 52 mated together. Halves 50 and 52 are of essentially identical shape and design. For sake of convenience, the reference numerals associated with half 52 bear primes whereas the reference numerals associated with half 50 do not. As is shown particularly in FIg. 3, the cross section of each half 50 and 52 is essentially cap-shaped with an outer ring portion 54 and an inner ring portion 56. Annular portion 58 includes an internal annular groove 60 adapted to receive toroidal ring member 62 to be described in further detail. Preferably, portion 58 includes a raised section 64 to give strength to the annular portion 58 in the region of annular groove 60. Raised section 64 also provides a flat ring surface against which the cartridge housing 22 and separator plate 42 may bear. Thus raised section 64 provides a region of strength for supporting the compression forces and provides a fluid seal against the cartridge housing and separator plate. A frustoconical portion comprising an outer sloped member 65 and an inner sloped member 67 joins annual portion 58 to ring portions 54 and 56, respectively. A plurality of apertures 66 and 68 are disposed annularly through the inner and outer sloped portions of halves 50 and 52. Preferably, apertures 66 and 68 are disposed opposite to each other around the periphery of the body. Typically, there may be thirty-six of each such apertures on each such half centered at 10° intervals about the circumference of the halves. Mounting tabs 55 may be conveniently formed in each half 50, 52 to provide for mounting of the filter to the fixed portions of the disk drive. Halves 50 and 52 are essentially identical in design, and hence may be fabricated by the same tooling equipment and techniques.

Halves 50 and 52 are preferably constructed of a suitable rigid plastic such as ABS (copolymers made from acrylonitrile, butadiene and styrene).

A pair of annular sheets 70 and 72 of filter material are sandwiched between the respective rings portions 54, 54′ and 56, 56′ within the cavity formed by the confronting portions of halves 50 and 52. Toroidal ring 62 is positioned within the cavity to nest within the grooves 60 and 60′ in the respective halves 50 and 52, so as to separate filter sheets 70 and 72 into substantially conical cross-sectional shapes and to sandwich the filter sheets between the ring member 62 and the respective half 50 or 52. Ring member 62 is preferably constructed of rigid plastic, such as ABS, and has a plurality of apertures 74 exposed about its periphery, conveniently at the same 10° positioning of apertures 66 and 68. Optionally, an additional sheet of filter material 76 fastened to the outside surface of toroidal ring 62 over apertures 74 to provide additional filtering of air passing radially through the filter.

Halves 50 and 52 and toroidal ring 62 are dimensioned so that the parts may be readily assembled to sandwich the filter material between ring 62 and the respective halves 50 and 52. After the elements have been assembled in the manner essentially indicated in FIG. 3, they are permanently joined in that relationship by conventional techniques such as adhesives or ultrasonic welding of the plastic ring portions 54, 54′ and 56, 56′.

The present invention thus provides a filter cartridge which is easily assembled and inexpensively manufactured, and which effectively filters contaminants from air being filtered therethrough. The inclusion of ring 62 provides added strength to the filter to enable the filter to react against the compressive forces occasioned by the positioning of a disk cartridge thereagainst as illustrated in FIG. 1. Also, annular portion 64 provides support for the filter and seals the filter against the disc cartridge 22 and separator plate 42.

This invention is not to be limited by the embodiment shown in the drawings and described in the description, which is given by way of example and not of limitation, but only in accordance with the scope of the appended claims.

What is claimed is:

1. A filter cartridge for filtering fluid caused to circulate within an enclosed housing by rotation of a structure within the housing, said cartridge comprising, in combination:
   (a) a rigid body portion having a pair of confronting mating halves forming an internal filter cavity, each of said halves comprising:
      (i) an inner ring portion and an outer ring portion;
      (ii) an annular portion between said inner and outer ring portion;
      (iii) a frustoconical portion joining said annular portion to said inner and outer ring portions, said frustoconical portion having a sloped inner member joining said annular portion to said inner ring and having a sloped outer member joining said annular portion to said outer ring; and
      (iv) a plurality of first apertures through said sloped inner member and a plurality of second apertures through said sloped outer member;
   (b) first and second annular sheets of filter media engaged about their outer peripheries between the outer ring portions of said confronting havles and about their inner peripheries between the inner ring portions of said confronting halves; and
   (c) a ring member supported by said annular portions within said filter cavity between said first and second sheets of filter material to engage said first sheet of filter material against an internal surface of the annular portion of one of said confronting halves and to engage said second sheet of filter material against an internal surface of the annular portion of the other of said confronting halves, said ring member having a plurality of third apertures therethrough;
said confronting halves being permanently joined together at the inner and outer ring portions thereof with said first and second sheets of filter media engaged therebetween, whereby fluid flowing radially between the outside and the inside of the annulus formed by the cartridge passes through at least two regions of filter media.

2. A filter cartridge according to claim 1 further including a third sheet of filter material connected to said ring member so as to cover said third apertures.

3. A filter cartridge according to claim 2 further including an annular groove in the internal surface of the annular portion of each of said halves, said ring member being nested within the annular grooves in each of said halves to sandwich a portion of said first sheet of filter material between said ring member and the annular portion of one of said confronting halves and to sandwich a portion of said second sheet of filter material between said ring member and the annular portion of the other of said confronting halves.

4. A filter cartridge according to claim 1 further including an annular groove in the internal surface of the annular portion of each of said halves, said ring member being nested within the annular grooves in each of said halves to sandwich a portion of said first sheet of filter material between said ring member and the annular portion of one of said confronting halves and to sandwich a portion of said second sheet of filter material between said ring member and the annular portion of the other of said confronting halves.

* * * * *